DIGITAL AUTOMATIC TIME DOMAIN EQUALIZER

Filed May 22, 1964 2 Sheets-Sheet 1

INVENTORS
WILLIAM S. MOHN
LARRY L. STICKLER

BY W. S. Robertson

ATTORNEY

DIGITAL AUTOMATIC TIME DOMAIN EQUALIZER

United States Patent Office 3,356,955

Patented Dec. 5, 1967

3,356,955
DIGITAL AUTOMATIC TIME DOMAIN EQUALIZER

William S. Mohn, Boston, Mass., and Larry L. Stickler, Wappingers Falls, N.Y., assignors to International Business Machines Corporation, New York, N.Y., a corporation of New York Filed May 22, 1964, Ser. No. 369,400
13 Claims. (Cl. 328—164)

ABSTRACT OF THE DISCLOSURE

A circuit for reshaping (equalizing) a digital signal that has been distorted by a transmission system. At each clock time the amplitude of the distorted input waveform is converted to a digital value, and these values are advanced through a register as new input values appear. The circuit includes a gains register having a stage for each stage of the amplitude register. During each clock period, the value in each stage of the amplitude register is multiplied by the value held in the corresponding stage of the gains register. The products are summed to form the equalized data output. The gains register can be adjusted easily to have the appropriate values for equalizing the input waveform. The disclosure presents a simplified theoretical explanation of time domain equalization.

The disclosure also teaches a clock that stays synchronized with the input data even though the times when the data signals appear are not directly detectable from the distorted input waveform.

The disclosure also teaches an arrangement of the circuit to predistort a digital signal so that on further distortion by the transmission system the signal will achieve a readily recognizable form.

*Introduction to time domain equalization*

Some data transmission lines (particularly telephone lines) distort the wave forms they transmit in a way that makes it difficult to distinguish nearby pulses and spaces, an effect called intersymbol interference. A rectangular pulse excited on such a transmission line may appear at a receiver as a main peak preceded by a few oscillations called prepulses and followed by a longer oscillatory trailing edge. The distorted received pulse may extend over a region several times the width of the original transmitted pulse, and without some kind of correction (called equalization) pulses would have to be transmitted slowly to keep the leading and trailing disturbance associated with the main peak separate from any nearby ones or zeros. By equalization, pulses can be crowded close together so that a pulse rides in the region of distortion associated with adjacent pulses in an unequalized system.

In one form of equalization, called frequency domain equalization, the transmission line is analyzed to determine its transfer function and an electrical network is designed with the appropriate offsetting characteristic to combine with the transmission line to produce a transfer function that reduces distortion sufficiently for distinguishing nearby adjacent pulses.

In the time domain equalization technique that will be discussed in detail here, the distorted pulse itself is analyzed as a function of time without regard to the transfer function of the line, except that the transfer function must be linear and it must be time invariant for reasonable periods. In such a system each transmitted pulse is distorted in the same way. The equalizer is set up to transform a particular distorted wave form back into its original narrow rectangular form. The time domain equalizer of the type discussed here corrects the distorted received pulse to have a value of one corresponding to the main peak and to have a value of zero at particular other times, called the sample times, when a preceding or following pulse might occur; between the sample times the corrected pulse may have any value because these values are disregarded by the apparatus that responds to the information in the wave forms. The main peaks of the distorted received wave forms and other points that are spaced apart by the sample time interval will be called sample points. Because the relationship between the instantaneous value at one point on the received distorted wave form and the corresponding point on the corrected wave form is not unique, the equalizer does not simply modify the received wave form as it enters the equalizer; there is a unique relationship between the group of sample points that have entered the receiver at a particular instant (a new sample point enters at each sample time) and the corresponding instantaneous value of the corrected wave form, and a time domain equalizer uses this relationship to produce a corrected amplitude in the output pulse. For example, suppose that the first sample point to enter the receiver is a main peak having some value $S_1$; amplifying this value by a suitable gain $G_1$ will produce the desired output value of one. At the next sample time the receiver has received two sample points, $S_1$ and $S_2$, and there is a unique combination of gains applied to the two sample points, $$S_2G_1+S_1G_2$$

that transforms $S_1$ and $S_2$ into a zero as is appropriate in the corrected wave form.

So far, this discussion has considered correcting a single pulse and its disturbance without regard to possible nearby pulses that may partially overlap the specific pulse being analyzed. This simplification is justified in a linear system; a complex wave form made up of a peak pulse or a zero and the overlapping trailing and leading edges of nearby pulses can be analyzed by a superposition into components associated with individual main peaks.

*Objects*

One of the problems with known prior art time domain equalization devices is to keep the receiver sample times synchronized with the incoming pulses. Some time domain equalization devices have used tapped delay lines to establish the points on the distorted received wave form that are simultaneously sampled to produce a single point on the corrected wave form. Because the sample points on the wave form are spaced apart by the interval between pulses, the pulse frequency has to be kept at the value that the delay line is tapped for. One of the objects of this invention is to provide a new and improved time domain equalization device that can be adjusted easily to receive pulses at various selected pulse rates.

A second problem of known time domain equalization devices is that they have not had a systematic way to set up the receiver to correct for a particular wave form. The switching connections between the transmitter and receiver may be changed rather frequently, and the receiver then must be re-adapted to equalize pulses of a new shape. As has already been explained, the equalizer is set up for a particular wave form by adjusting the gains of amplifiers associated with each sample point to produce a one or a zero as appropriate. One object of this invention is to provide a time domain equalizer that operates according to a simple procedure so that the relationship between the points on a distorted wave form and the appropriate corrections can be generated rapidly.

*Introduction to the invention*

As the distorted received wave form enters the equalizer of this invention, the amplitude at each sample point is entered in a register; these values are progresively shifted through a series of stages of the register so that at each sample time the register contains the amplitudes of the wave form over a span of several sample points. At each sample time the value in each stage of the register is multiplied by a value that is preset for each register stage and these products are summed to produce the instantaneous value of the corrected wave form at the sample time. One of the advantages of this structure is that the rate of shifting the wave form amplitudes through the register can be varied to correspond to the received pulse rate.

One of the features of the device of this invention is that it is easy to set up the gains in response to a test signal comprising a one followed by a series of zeros. The gain associated with the first register is made unity to transmit the main peak as a one and gains for successive stages of the register are adjusted in succession to the appropriate value to make the sum at the output equal zero following the main peak. A circuit is provided for automatically setting up the gains according to this procedure. When the distorted received pulse contains prepulses, the unity gain is associated with an intermediate stage of the amplitude register; the process of adjusting the other gains is repeated several times until a suitable combination of gains is achieved.

One of the problems in providing the time domain equalizer of this invention as it has been described so far is in keeping the sample times synchronized in phase and frequency with the received pulses. Since individual pulses are not recognizable except at the receiver output, there is no direct indication of the incoming pulses for comparing their phase with the sample times generated by the equalizer. If the sample times generated by the equalizer clock become out of phase with the incoming pulses, the receiver output degenerates and the amplitude of one becomes less than the assigned value, and the value at intended zeros becomes larger. The circuit of this invention uses this information to detect the phase of the received pulses; however, it is difficult to detect an out of phase condition because the effect in the wave form is the same for a leading or a lagging phase difference.

In the time domain equalizer of this invention, an adjustable frequency clock establishes the sample times; the clock is continuously adjusted rather slowly to change its rate, and the adjustment is changed from one direction to the other whenever the equalizer output starts to degenerate; in other words, the control perturbs the clock phase about the phase of the received pulses to establish the phase direction relationship between the received pulses and the clock. To detect whether the output is improving or degenerating, the circuit stores and compares successive outputs of the equalizer.

The detailed description of the preferred embodiment of the invention will explain other problems in providing an automatic digital time domain equalizer and corresponding additional objects, advantages, and features of this invention.

Figure 1:
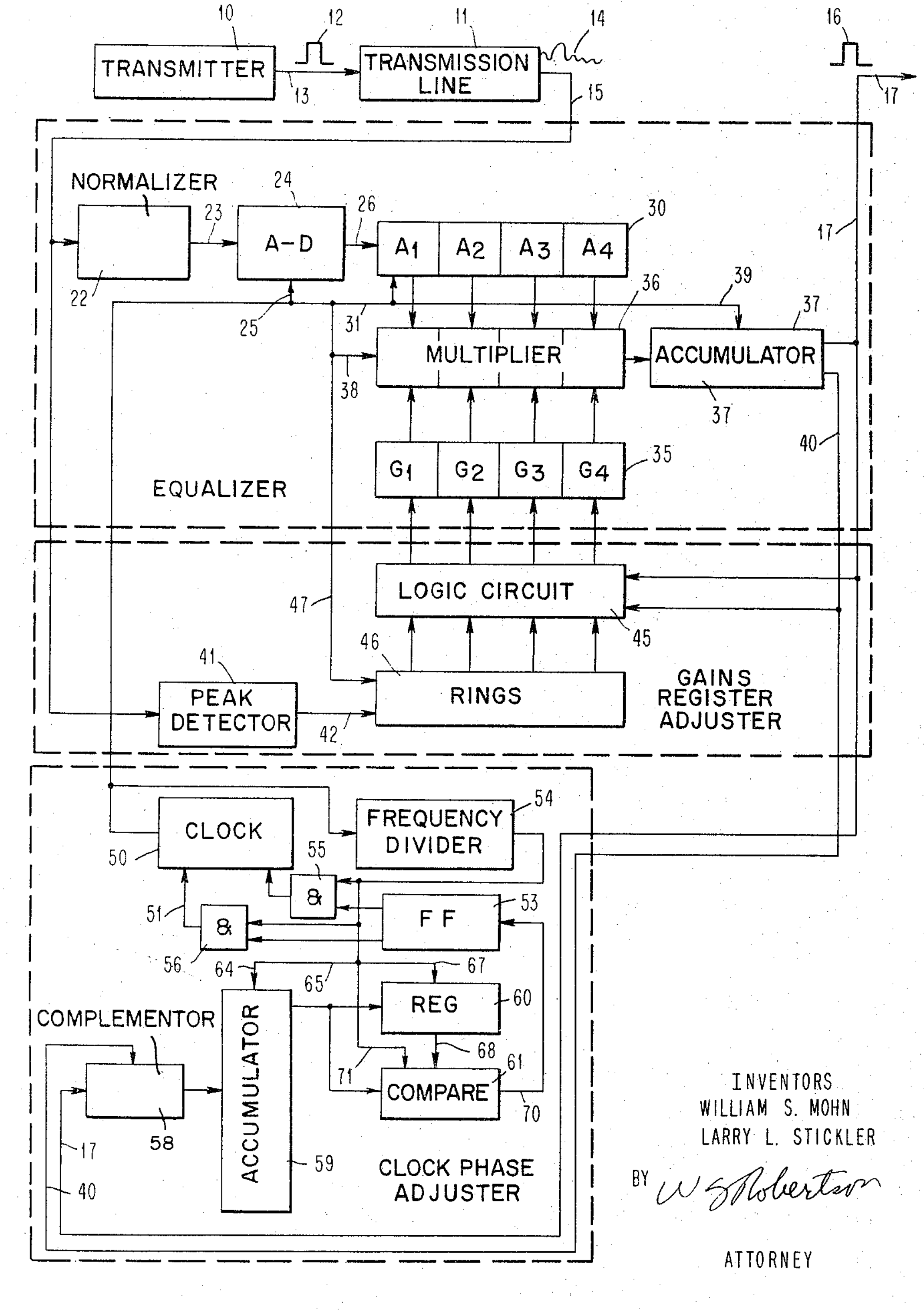
FIGURE 1 is a schematic of the time domain equalizer of this invention as it is supplied at the receiver of a data transmission system.

*The circuit of FIGURE 1; introduction*

The equalizer of FIGURE 1 is intended to receive pulses that are produced by a transmitter 10 and carried over a transmission line 11 that produces phase and amplitude distortion as is represented by the rectangular pulse 12 at the output 13 of the transmitter and the pulse 14 at the receiving end 15 of the line. Pulse 14 has an oscillatory trailing edge and a preceding region of prepulses. The circuit of this invention operates on the distorted pulses 14 to produce corrected pulses 16 at its output 17. The circuit will be described in three sections that are each enclosed in dashed lines in the drawing: an equalizer that receives the distorted wave form 14 and produces the corrected wave form 16, and two associated circuit groups, a gains adjustor used in setting up the equalizer to correct a particular wave form 14, and a circuit that provides a clock signal that is properly synchronized with the received pulses.

*The equalizer*

The equalizer includes a normalizer 22 that is connected to receive the distorted pulses 14 from line 11 and to produce at its output 23 a corresponding signal in which the peak pulse has unity amplitude. An analog to digital converter 24 is connected to receive the normalized counterpart of wave form 14 at output 23 and is controlled in response to a clock input 25 to produce a binary count value at its output 26 corresponding to this amplitude at the sample times.

An amplitude register 30 is connected to transform the time varying sequence of binary values at output 26 into a simultaneous array of values in the register stages. Amplitude register 30 has a plurality of stages designated $A_1$, $A_2$, $A_3$, $A_4$ in the four functional boxes of FIGURE 1. For the simplest example the number of stages may equal the number of sample points that are considered in the distorted pulse 14. Each stage of register 30 may comprise means such as a plurality of flip-flops that are connected to respond to clock pulses at an input 31 to receive and store the output of converter 24 in the first stage $A_1$ and to shift this value from one stage to the next with each clock pulse.

Figure 2:
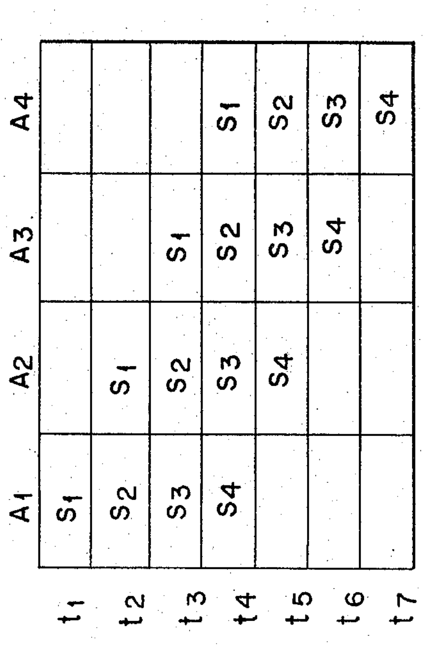
FIGURE 2 is a matrix illustrating the operation of the time domain equalizer of this invention.

FIGURE 2 shows a matrix in which the rows indicate the contents of each stage of amplitude register 30 at a particular time and the columns indicate a sequence of values for a particular stage of the register. The matrix of FIGURE 2 contains the amplitudes of a single pulse that is four sample times wide and has values $S_1$, $S_2$, $S_3$, and $S_4$ at its sample points. At time $t_1$ the first sample point on the wave form has entered stage $A_1$ and the other stages are empty. In the simple case in which there are no prepulses, $S_1=1$ and the appropriate value at the equalizer output is also one. At time $t_2$ register stage $A_2$ contains the $S_1$ value (the main peak in the example) and stage $A_1$ contains the value $S_2$ of the first sample point in the trailing of the pulse, and the appropriate value at output 17 is zero. As FIGURE 2 illustrates, the succession of pulses through amplitude register 30 establishes a sequence of unique relationships between the sample points of the wave form and the stages of the register.

A gain register 35, a multiplier 36 and an accumulator 37 cooperate to transform the contents of amplitude register 30 at each sample time into a single point in the corrected wave form at output 17 according to the matrix of FIGURE 2. At each sample time established by a clock pulse at input 38, multipler 36 receives the time varying values held by associated stages of amplitude register 30 and a constant value held by a corresponding stage of gains register 35; it multiples these pairs of values and accumulator 37 responds to a clock pulse at an input 39 to form the sum of the products. Preferably accumulator 37 produces a binary number of several bits; the most significant bit appears at circuit output 17 and the lesser significant bits appear at an output 40. When the stages of gains register 35 are given the appropriate values, the sum of products at output 17, 40, is a one at the time corresponding to the first row in FIGURE 2 and is a zero for every other row. The problem of giving each stage of gains register 35 an appropriate value has been introduced in the discussion of the matrix of FIGURE 2. It will be discussed in more detail in the description next of means to automatically adjust the gain of each stage of the gains register.

*Gains register adjustor*

To set up the gains register for the example in which there are no prepulses, a training signal is transmitted that consists of a one followed by a series of zeros which produces a single distorted received pulse; the first stage $G_1$ of gains register 35 is preset to unity and the other register stages are set to zero. At each sample time the gains register stage associated with the amplitude register stage containing the one value of the peak pulse is adjusted and the previous register stages hold their settings. The following discussion will first explain the appropriate numerical values for the gains register stages and next the circuit for giving the register these values.

Since the first stage of the gains register has a unity value and the peak pulse is adjusted to unity value by normalizer 22, the output at time $t_1$ in FIGURE 2 appropriately equals one. At time $t_2$ when the amplitude register contains values $S_2$ and $S_1$, accumulator 37 receives the sum of products $G_1S_2+G_2S_1$ which should be made to equal zero; that is, the gains register should be set to make $$G_2=-\frac{G_1S_2}{S_1}$$

Since $G_2$ was initially zero and $G_1$ and $S_1$ are unity, the appropriate value for $G_2$ numerically equals the negative of the sum of products: $G_2$ becomes $-(G_1S_2+G_2S_1)$.

At time $t_3$ the sum of products is $G_1S_3+G_2S_2+G_3S_1$ as FIGURE 2 shows; as in the example for time $t_2$, the appropriate gain for the new stage, $G_3$ is the negative of the sum of products:

$$G_3=\frac{G_1S_3+G_2S_2}{S_1}$$

Similarly, at time $t_4$ the sum of the products at output 17, 40 numerically equals the appropriate value to give gains register stage $G_4$.

At times $t_5$, $t_6$ and $t_7$ there are no more registers to adjust in the example of FIGURE 2 and the value at output 17, 40 in general is not exactly zero. However, because the trailing edge of the distorted pulse decreases in amplitude, the stages of the gains register taper in value; this in turn causes the products for times $t_5$, $t_6$, and $t_7$ to be very nearly zero. To provide a selected taper for the gains register, it may be provided with more stages than the number of sample points in the distorted wave form.

FIGURE 1 shows the circuit for giving stages of the gains register the negative of the value at output 17, 40. A pulse main peak detector 41 is connected to receive the distorted wave form 15 and to produce a signal at its output 42 indicating the center of the main peak; devices for recognizing and indicating individual peaks in terms of magnitude differences in the wave form are well known. A logic circuit 45 and means such as a ring 46 are connected to direct the output 17, 40 of accumulator 37 to the appropriate stage of gains register 35 in response to a clock signal at an input 47 and in response to main peak signals. Logic circuit 45 may comprise means to transform the binary values represented by the state of inputs 17, 40 to a series of pulses and an AND gate for each stage of gains register 35 responsive to an input from ring 46 to direct the pulses to adjust the stored value of the appropriate gains register stage. Ring 46 may be connected to respond to peak input 42 to be set to a predetermined stage of gains register 35 and to respond to clock sequels at input 47 to advance from one stage to the next.

With the circuit of FIGURE 1 it is not necessary that any of the gains registers be set to zero as in the example; a value corresponding to the value preset in a register will appear in the sum of products at output 17, 40 so that the negative of output 17, 40 is the appropriate change in one stage of the gains register. Thus, the gains register can be readjusted to correct slight errors (or to develop appropriate gains by successive trials as will be explained next).

In the examples explained so far, the distorted received wave forms do not contain prepulses, and the stages of the gains register can be adjusted in succession once, and the setting of one stage does not require readjustment of any previous registers. When the distorted received wave form contains prepulses, the apparatus of FIGURE 1 operates in a somewhat more complex manner. Initially, all of the gains registers are set to zero (to simplify the example) except one that is set to unity, as in the simpler example; however, the unity gains register is located to have one or more zero registers to the input side of it. The problem of transforming prepulses in the first stages of amplitude register 30 into zeros is similar to the problem already discussed of producing zeros at times $t_5$, $t_6$, and $t_7$ in the example of FIGURE 2; exact zeros cannot generally be obtained, but by tapering the values of the gains register appropriately, the value at output 17, 40 can be kept acceptably low. The problem is more severe in the case of prepulses because typical wave forms of received pulses do not taper significantly. Consequently, more stages are usually required in registers 30 and 35 when the wave form contains prepulses.

Setting up the gains registers when the distorted received wave form contains prepulses requires successively resetting the registers as a series of training pulses are transmitted. For most transmission systems the equalizer will be made to produce a better wave form on each successive adjustment of the gains registers.

*Clock phase control*

The circuit includes a clock 50 that produces the clock pulses at inputs 25, 31, 38, 39 and 47; clock 50 preferably includes a conventional oscillator and counter that cooperate to produce pulses at the oscillator frequency divided by the count value the counter is set for. Clock 50 has two inputs 51, 52 that are energizable to increase or decrease the count and thereby change the clock rate. When the clock rate about equals the frequency of pulses 14, applying pulses to an input 51 or 52 causes the clock pulses to shift slightly in phase with respect to the received pulses 14. A flip-flop 53, a frequency divider 54, and a logic circuit of two AND gates 55, 56 cooperate to energize the appropriate one of the two clock adjusting inputs 51, 52 at a submultiple of the clock frequency. In contrast to conventional phase correcting systems in which it is known whether the controlled frequency leads or lags its reference, the phase control system of this invention establishes a known condition that the clock frequency is either increasing or decreasing. The circuit group that will be described next detects whether the phase difference is increasing or decreasing (without regard to whether it is leading or lagging) and operates flip-flop 53 to control the clock frequency to keep the phase difference decreasing.

When the clock 50 is kept in phase with received pulses 14 (and gains register 35 is appropriately set up) the equalizer output 17, 40 has well defined one and zero values except for noise. When the phase of the clock shifts in either direction, the output degenerates so that ones and zeros differ less in value. A device 58, an accumulator 59, a register 60 and a comparator 61 cooperate to detect the difference between the actual values of output 17, 40 and the ideal values, to compare the values on successive periods and detect whether the output is improving or degenerating, and to trigger flip-flop 53 to change its state when the output degenerates.

In the preferred phase corrector of FIGURE 1, device 58 is a complementor that converts the difference between actual and ideal values of both ones and zeros to a common base. Complementor 58 is connected to receive the accumulator output 17, 40 and to transmit either the lesser significant numbers 40 or their complement to accumulator 59 at each sample time in response to the state of the most significant bit output 17. When the most significant bit at output 17 is a zero, the lesser bits 40 indicate directly the difference between the actual sum of products and the ideal sum; when the most significant bit at output 17 is a one, the complement of the lesser significant bits is the difference between the actual sum and the ideal sum.

Accumulator 59 is controlled by a submultiple clock signal at an input 64 to accumulate the output of complementor 58 for a sufficient number of sample times to average out noise at the complementor output. At its output 65 accumulator 59 produces a few most significant bits of its accumulated value. Register 60 responds to submultiple clock signals at an input 67 to receive the value at accumulator output 65 and produce this values at its output 68. Thus, accumulator 59 and register 60 provide values at their outputs 65, 68 indicating the error in the sum of products for two successive intervals. Comparator 61 is connected to receive and compare outputs 65, 68 and to produce a pulse at its output 70 in response to a submultiple clock signal 71 to trigger flip-flop 53 if the value of accumulator output 65 is higher than the value of register output 68.

Figure 3:
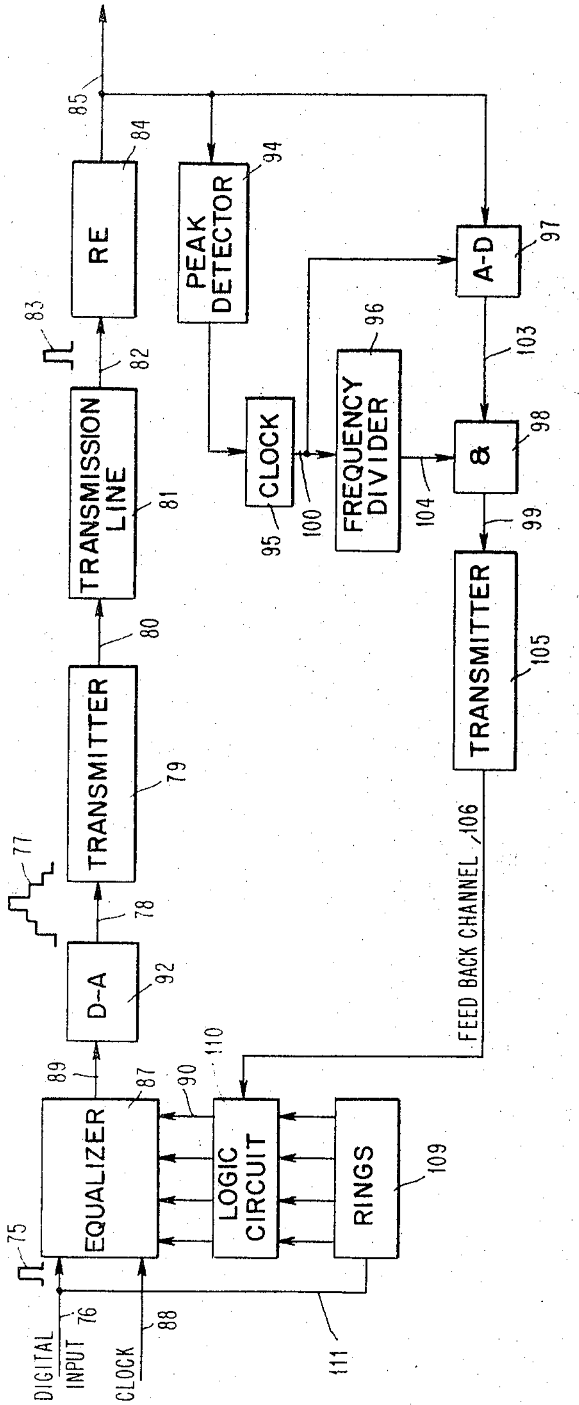
FIGURE 3 is a schematic of the time domain equalizer of this invention as it is applied in a data transmission system to predistort pulses at the transmitter.

*Circuit of FIGURE 3*

As the circuit of this invention is shown in FIGURE 3, it receives digital data or training pulses 75 at an input 76 and produces predistorted pulses 77 at an output 78. A transmitter 79 is connected to receive the output pulses 77 and to apply them to the input 80 of a transmission line 81. At the output 82 of transmission line 81 the predistorted pulse 77 appears as a narrow rectangular wave form 83. A receiver 84 transforms wave form 83 into an appropriate form at its output 85.

The circuit includes an equalizer 87 that comprises the amplitude register 30, the gains register 35, the multiplier 36 and the accumulator 37 of FIGURE 1. The input 76 in FIGURE 3 corresponds to digital input 26 in FIGURE 1; a clock input 88 from the source of pulses 75 corresponds to the clock input 31 in FIGURE 1; and the output 89 of equalizer 87 corresponds to output 17, 40 in FIGURE 1; equalizer 87 also receives gain adjusting inputs 90 from other components of the circuit that will be described later.

When digital input 76 receives binary signals, as wave form 75 represents, each stage of the amplitude register contains either a one or a zero. When a training pulse consisting of an isolated one advances through the amplitude register, a succession of binary values appears at the accumulator output 89 at each sample time; a digital to analog converter 92 is connected to receive output 89 and to produce the corresponding wave form 77 at the transmitter input. In the normal operation the amplitude register may contain ones in several stages and the accumulator produces a complex output of the superposed values of the single predistorted wave form 77 for each of the nearby input pulses 75. As such a complex wave form is propagated along transmission line 81, the phase shifts and amplitude attenuation caused by the line separate the components of the input signal 77 into discrete pulses at the receiver input 82.

Like the circuit of FIGURE 1, the circuit of FIGURE 3 has its gains register adjusted to appropriate values while a sequence of training pulses are transmitted. The following discussion will first explain the appropriate adjustments to the gains register (which, like FIGURE 1, equals the amplitude of the received wave form 83) and will then describe the components that operate to adjust the gains register.

Suppose that some intermediate stage of the gains register is set to unity and all other stages are set to zero so that in response to a single training pulse 75 the circuit produces at the receiver output 85 a peak pulse having an amplitude of one preceded by zeros at each sample time and followed by amplitudes $S_2$, $S_3$, etc. for several sample times. The next stage of the gains register can then be given the negative of the value $S_2$ so that in response to a second training pulse equalizer 87 will produce an output two sample times wide. By superposition the effects of the two sample times can be considered separately and in the example in which the line does not produce prepulses the main peak of the received wave form 83 is unchanged by giving the transmitted wave form 77 the value $-S_2$ at the second sample time. As the example has been explained so far, the received pulse 83 has the correct values at the first two sample times. By transmitting additional training pulses each stage of the gains register can be adjusted in sequence without readjusting any of the preceding stages.

When the transmission line 81 produces prepulses associated with the originally transmitted training pulse, it will produce prepulses ahead of each additional sample time that has a nonzero value in the predistorted pulse 77. Thus, setting the second gains register requires resetting the first gains register. Because the amplitudes of the prepulses are appreciably smaller than the amplitude of the associated peak pulse, successive adjustment of all the stages of the gains register progressively improves the received wave form 83. As has been explained in the description of FIGURE 1, the stages of the gains register are tapered from a substantially negligible value at the input to the unity value at an intermediate register in order to make the prepulses in the received wave form 83 acceptably small.

Suitable means such as a peak detector 94, a clock 95, a frequency divider 96, an analog to digital converter 97, and a logic circuit 98 cooperate to receive the wave form 83 at output 85 and produce at an output 99 a series of pulses representing the amplitude of the received wave form at a sample time in each training pulse that is advanced as each training pulse is transmitted. Clock 95 produces a signal at its output 100 that is synchronized by means of peak detector 94 with clock input 88 associated with the transmitter. Analog to digital converter 97 is connected to receive the wave form at receiver output 85 and it is controlled in response to an input from clock 95 to produce at its output 103 a digital signal corresponding to each of the sample time amplitudes $S_1$, $S_2$, etc. Frequency divider 96 may be set to count clock pulses at input 100 in groups of one more than the number of the stages in the gains register that are being set. Logic circuit 98 which may comprise an AND gate responds to the amplitude indicating signals on input 103 and the output 104 of frequency divider 96 to transmit amplitudes at the sample times established by the frequency divider.

A suitable transmitter 105 is connected to receive the signal at output 99 and to transmit it along a feedback channel 106 to the gains adjusting components at the transmitter.

At the transmitter suitable means such as a ring 109 and a logic circuit 110 cooperate to transmit the signal received on the feedback channel 106 to the appropriate stage of the gains register of equalizer 87. Ring 109 receives an input 111 to be shifted from one position to the next as each training pulse 75 is applied to the circuit. Logic circuit 110 may comprise an AND gate for each stage of the gains register with one input connected to feedback channel 106 and another input connected to a stage of ring 109. Feedback transmitter 105 is conventionally adapted to initially provide signals for synchronizing the ring to energize the appropriate stage of logic circuit 110.

*Other embodiments*

The detailed description of the two embodiments of FIGURE 1 and FIGURE 3 will suggest variations in the components and the component relationships illustrated. For example, in the circuit of FIGURE 3 the multiplier and the gains register of equalizer 87 and the digital to analog converter 92 may be replaced by a group of adjustable gains amplifiers and the accumulator for this modification may be replaced by a circuit to sum the outputs of the amplifiers. From the detailed descriptions, additional circuit components will be suggested; for example, where a single training pulse has been described in the operation of the circuits, a succession of training pulses may be transmitted and the values at a sample time averaged to eliminate the effects of noise before adjusting the gains register. Other forms of equalization, such as frequency domain equalization already mentioned, may be used with the equalizer of this invention. The specific logic circuits illustrated in FIGURE 1 and FIGURE 3 will suggest various functionally equivalent circuits.

The clock phase corrector of FIGURE 1 will be useful in time domain equalizers of the type that use tapped delay lines to establish sample points on the received wave form; the clock is also useful generally in applications where information about the clock phase with respect to a reference is ambiguous in the direction of the phase error.

Within the spirit of the invention and the scope of the claims those skilled in the art will recognize a variety of applications and modifications of the two embodiments of the invention specifically disclosed.

What is claimed is:

1. A device for reducing inter symbol interference in a digital data transmission system comprising:

a register having a plurality of stages and responsive to a clock signal to store an input in a first of said stages and to operate each other stage to receive the contents of the preceding stage;

means for supplying to said register first stage a digital input representing the amplitude of an input waveform;

means for supplying clock signals to said amplitude storing register in substantially a predetermined phase relationship to clock times on the input waveform whereby said register is given at each clock time a sequence of values simultaneously representing the amplitude of a plurality of points on the input waveform and said values are advanced through the register during transmission of data on the system;

a gains register having a plurality of stages corresponding to the stages of said amplitude register; and means connected to be responsive to the contents of each amplitude register stage during each clock time and to the corresponding stage of said gains register to form a single point of an output waveform that is a function of the points on the input waveform represented by said amplitude register and the values stored in the corresponding stage of said gains register.

2. A device according to claim 1 in which said gains register includes setting means to produce an output wave form several sample times wide in response to an input consisting of an isolated pulse at one sample time.

3. A device according to claim 2 in which said gains establishing means has a plurality of stages corresponding to stages of said amplitude register, one of said gains stages being set to unity whereby applying an isolated pulse as the input to said amplitude register and transmitting the corresponding output wave form over a predetermined transmission line to a receiver results in a receiver output wave form having a main peak of unity value at one sample point followed by values at subsequent sample points that are proportional to adjustments to corresponding gains stages to reduce the amplitude at said subsequent sample points.

4. A device according to claim 3 including means connected to receive said receiver output wave sample point values and apply said values as gain corrections to appropriate gains stages.

5. A device according to claim 1 in which said means responsive to the register contents includes operating means to produce a digital output at said sample times.

6. A device according to claim 5 in which said means responsive to the register contents includes means to establish a time invariant gain for each stage of said amplitude register and means for multiplying the contents of each stage by its associated gain and summing the products at each sample time to form a point on the output wave form; said gains being adjustable to make the sum of products a one value in response to a peak pulse in the received wave form at a predetermined stage of said amplitude register, and a zero in the absence of a peak pulse at said predetermined stage.

7. A device according to claim 6 in which said means to establish a time invariant gain comprises a register having a stage for each stage of said amplitude register.

8. A device according to claim 7 including means for normalizing the received wave form whereby the stage of the amplitude register containing a peak pulse of an isolated input pulse has a unity value whereby the negative of the value of a sample point on the output wave form is directly proportional to the appropriate adjustment to the stage of the gains register associated with the amplitude register stage containing the peak to produce a zero output.

9. A device according to claim 8 including means to detect a peak in an isolated received wave form and means responsive to said peak detector and to the value of the output wave form to adjust each stage of said gains register except the stage assigned unity value according to the negative of the value of the output when the main peak is in the corresponding amplitude register stage.

10. A phase control for a clock operating in a system producing as an output a binary signal having ideally a one representing value and a zero representing value and having intervening values as the output signal degenerates from errors in the phase of the clock with respect to a reference comprising, means operable in a first state to control the clock to become faster than the reference and operable in a second state to control the clock to become slower than the reference, and means connected to a receive a measure of the system output signal and to detect whether the signal is degenerating or improving and operable in response to degeneration of the system output signal to change said clock control means from its existing state to its other state, whereby the clock phase oscillates about the reference.

11. A control according to claim 10 in which said means to change said clock control means includes means to separately respond to one indicating values and zero indicating values in the system output to operate said clock control means according to a change in errors with respect to at least one of the ideal values.

12. A control according to claim 10 in which said means to control said clock includes a two-state means which operates in one state to increase the clock rate and in the other state to decrease the clock rate.

13. A clock phase control according to claim 10 in which said clock control operating means transforms said binary output to a common base similarly indicating errors in one and zero values.

References Cited

UNITED STATES PATENTS

| | | | |
|---|---|---|---|
| 3,028,552 | 4/1962 | Hahs | 328—63 X |
| 3,184,685 | 5/1965 | Funk et al. | 328—61 |
| 3,209,265 | 9/1965 | Baker et al. | 328—63 |
| 3,238,462 | 3/1966 | Ballard et al. | 328—63 |

J. S. HEYMAN, *Primary Examiner.*